R. D. McMANIGAL.
DRAFT AIR HEATING SYSTEM FOR FURNACES.
APPLICATION FILED SEPT. 3, 1914.
1,146,188.
Patented July 13, 1915.
2 SHEETS—SHEET 2.
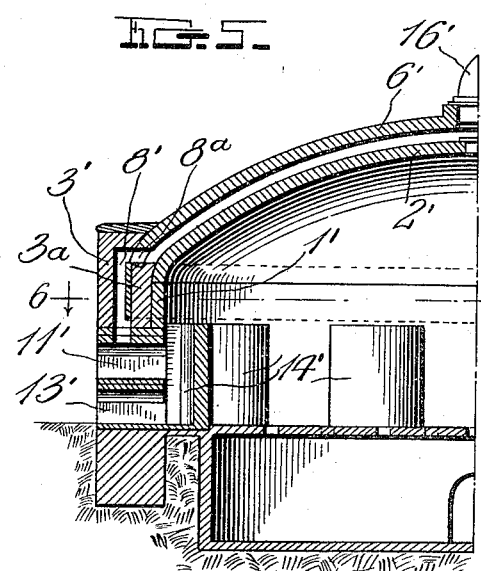
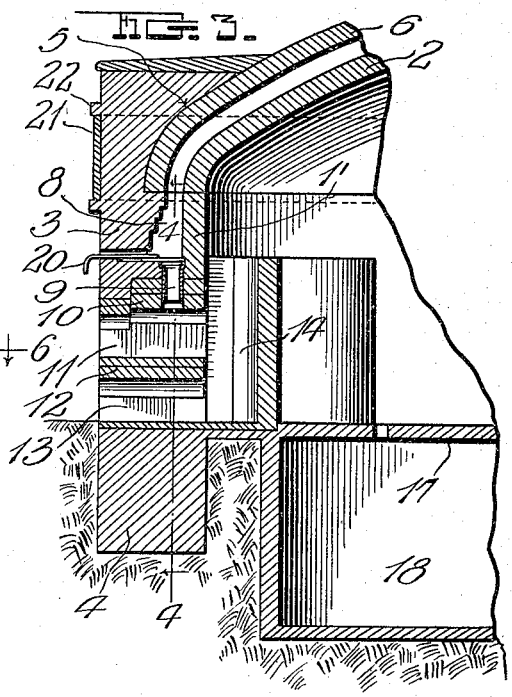
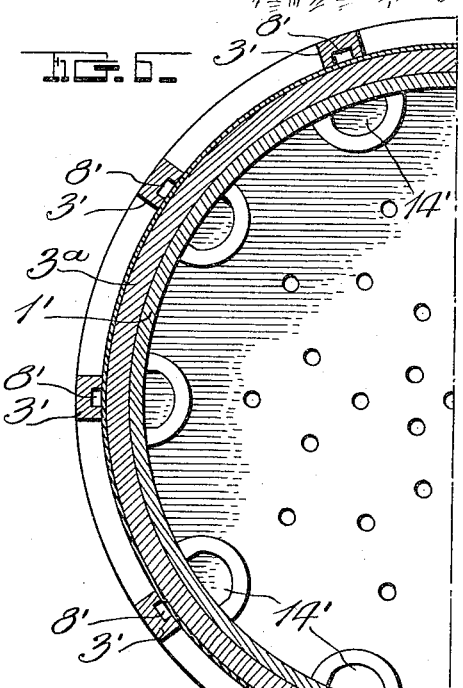
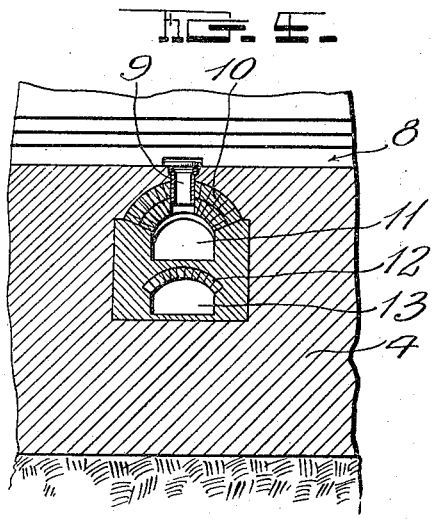
Inventor
Robert D. McManigal
By H. B. Willson & Co.
Attorneys
Witnesses
H. Woodard
C. Clemens

United States Patent Office.

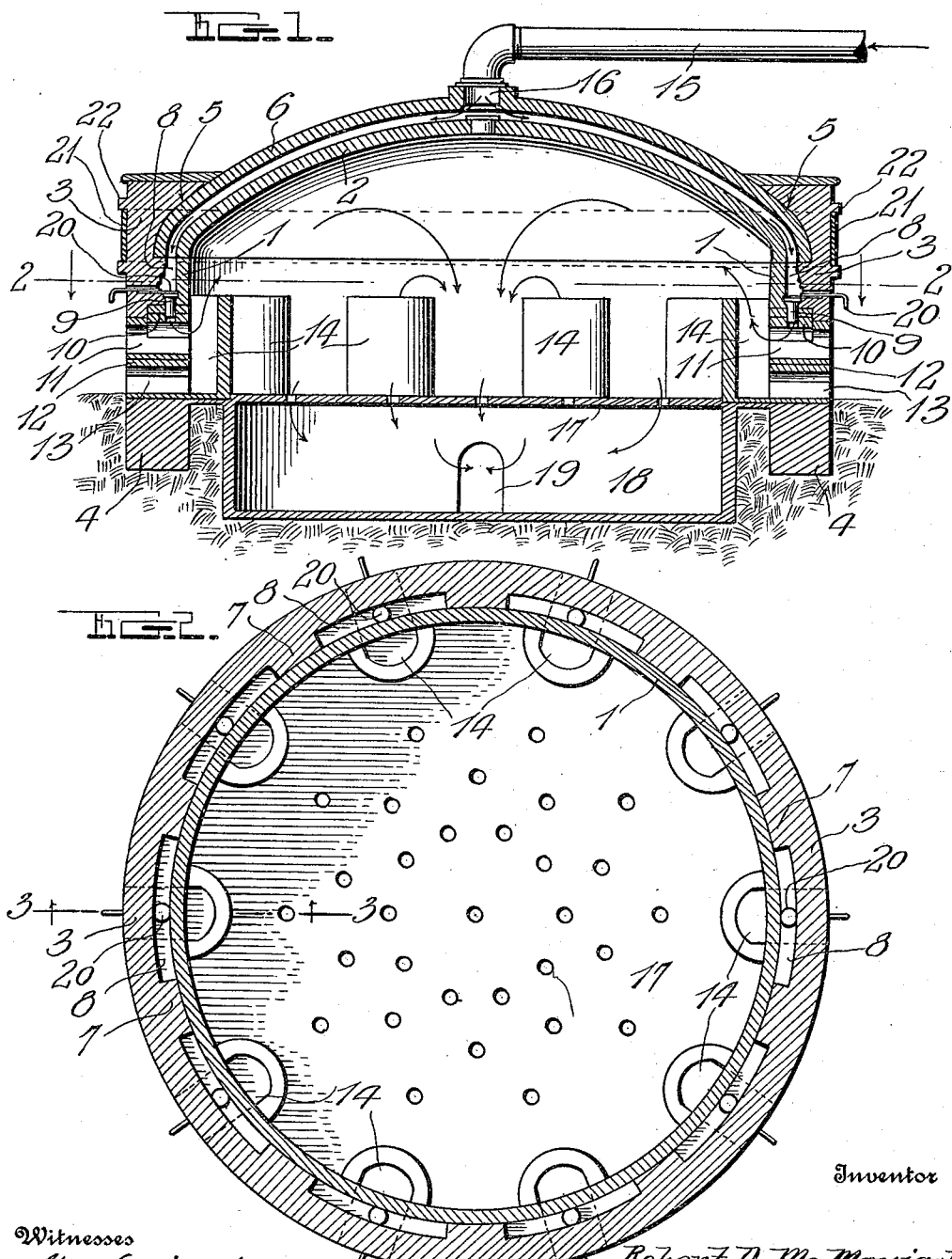

ROBERT D. McMANIGAL, OF LOGAN, OHIO.

DRAFT-AIR-HEATING SYSTEM FOR FURNACES.

1,146,188.   Specification of Letters Patent.   Patented July 13, 1915.

Application filed September 3, 1914.   Serial No. 860,059.   REISSUED.

*To all whom it may concern:*

Be it known that I, ROBERT D. MCMANIGAL, a citizen of the United States, residing at Logan, in the county of Hocking and State of Ohio, have invented certain new and useful Improvements in Draft-Air-Heating Systems for Furnaces; and I do declare the following to be a full, clear, and exact description of the invention, such as will enable others skilled in the art to which it appertains to make and use the same.

My invention relates broadly to improvements in furnaces and more particularly to those of the type employed for burning plastic material.

The main object of the invention is to provide a system whereby the draft air for the furnace may be preheated by utilizing the waste heat radiating from the furnace, thereby employing this waste heat to aid combustion.

A further object of the invention lies in providing simple construction whereby the system may be applied to brick kilns.

With the above and minor objects in view, the invention resides in certain novel features of construction and combination herein described and claimed and shown in the drawings wherein:

Figure 1 is a vertical transverse section through a brick kiln constructed in accordance with my invention; Fig. 2 is a horizontal section taken on the line 2—2 of Fig. 1; Fig. 3 is a detail vertical section taken on the line 3—3 of Fig. 2; Fig. 4 is a similar view as seen on the line 4—4 of Fig. 3; Fig. 5 is a vertical transverse section through one-half of a kiln of ordinary construction, showing the manner in which the preheating system may be applied thereto without unnecessary alterations; and Fig. 6 is a horizontal section as seen on the line 6—6 of Fig. 5.

In the accompanying drawings, from Figs. 1 to 4 inclusive, the numeral 1 designates an inner circular wall which supports, upon its upper end, a solid dome or crown 2, while the numeral 3 designates an outer wall which is spaced from the inner wall 1 at its upper portion as clearly seen in Fig. 2, while the lower portions of said walls are united to form an integral structure as seen at 4 in Figs. 1 and 3. The wall 3 rises a considerable distance above wall 1 and is provided with an internal annular groove 5 which receives the outer edge of a supplemental crown 6 which is spaced from the crown 2 a distance equal to the space between the upper end portions of the walls 1 and 3. As more clearly seen in Fig. 2, the wall is formed with a plurality of upright ribs 7 which contact with the wall 1, thereby forming a number of air passages 8 whose upper ends communicate with the space between the two crowns while their lower ends communicate with upright tubes or pipes 9 which project through arches 10 of fuel openings 11 which are formed through the united portion of the walls 1 and 3, horizontal partitions 12 being located beneath the openings 11 whereby to provide passages 13 through which ashes may be removed from a plurality of internal fire boxes 14 with which said passages 11 and 13 communicate.

The supplemental crown 6 is provided with a fresh air inlet 15 through which air, under pressure, is forced through a pipe 16, said air being heated within the heating compartment formed between the spaced crowns 2 and 6 and being then fed downwardly through the passages 8 and tubes 9 into the air passages 11 from which said heated air will then be discharged into the fire boxes 14, thereby aiding combustion within said fire boxes, the smoke and spent gases being then discharged through the usual perforated bottom 17 into a smoke pit which is provided with one or more outlets 19 which lead to a smoke stack (not shown). The amount of heated air fed to the fire boxes 14 may be regulated by the provision of a plurality of dampers 20 designed to close and open the upper ends of the tubes 9.

For the purpose of imparting rigidity to the structure above described, the upper end of the wall 3 is surrounded by a continuous metal band 21 which is here shown as located between upper and lower ribs 22.

In the form of the invention illustrated in Figs. 5 and 6 the numeral 1' designates an upright inner wall, 2' the crown or dome thereof, 11' and 13' designate respectively the fuel and ash openings, while 3' identifies a number of independent upright posts or pillars which are built upon the exterior of an outer wall 3ª which surrounds the wall 1', the posts 3' being grooved on their inner faces to provide upright air passages 8' whose lower ends communicate directly with the openings 11' while their upper ends are turned inwardly and register with openings 8ª formed in the edge of a supplemental crown 6' which is spaced from the crown 2', an air pressure pipe 16' being provided for forcing air into the space between the crowns 2' and 6' whereby said air may be heated and then fed to the fire boxes 14', through the passages 8' and 11'. It will be understood that this form of the device operates in the same manner as that previously described and that the effect is the same. The last described structure, however, is preferably employed for equipping an old kiln with the improvements.

From the foregoing description taken in connection with the accompanying drawings, it will be seen that extremely simple and efficient means have been provided for preheating the draft air of the furnace and for feeding the same into the fire boxes.

I may here explain that I am aware that numerous other devices have been employed which, at a glance, resemble the construction illustrated in the accompanying drawings and described above. Careful inspection, however, discloses the fact that the space between the inner and outer crowns, in these devices, is not designed for heating the draft air but merely constitutes a supplemental heating jacket for preventing excessive escape of heat from the kiln or that these spaces merely constitute smoke passages through which the smoke from the interior of the kiln is discharged. Furthermore, the above mentioned devices which may be identified by the following patent numbers, 95,339; 524,390; and 85,813, do not show spaced crowns, a fresh air inlet into the space between said crowns and heated air outlets from said space into the interior of the furnace.

Having thus described my invention, what I declare as new and desire to secure by Letters-Patent is:

1. The combination with a furnace, of a' crown spaced from the crown thereof, a fresh air inlet into the space between the crowns, and a hot air outlet from said space into the furnace.

2. The combination with a furnace having a smoke outlet in its bottom, of an air heating compartment above said furnace, and a hot air outlet leading from said compartment into the lower side of the furnace.

3. The combination with a furnace comprising an upright continuous wall, a plurality of fire boxes adjacent the interior of said wall, a smoke outlet from the furnace, and a main crown supported by said wall, of a supplemental crown spaced above the main crown, a fresh air inlet into the space between the two crowns, and a plurality of hot air outlets leading from said space to said fire boxes.

4. The combination with a furnace comprising an upright continuous wall, a plurality of fire boxes adjacent the inner side of said wall, said fire boxes having air inlet openings through said wall, a smoke outlet from the furnace, and a main crown supported by said wall, of a supplemental crown spaced above the main crown, a fresh air inlet into the space between the two crowns, and a plurality of hot air outlets leading from said space to said air inlets of the fire boxes.

5. A furnace comprising an inner continuous wall having a plurality of radial air inlets formed through its lower portion, a plurality of fire boxes within said inner continuous wall, one fire box being provided adjacent each air inlet, an outer wall surrounding the inner wall and having a plurality of upright grooves formed in its inner face whereby to provide hot air passages, one of said hot air passages being provided above each of said air inlets, other hot air passages establishing communication between the first named passages and said air inlets, inner and outer crowns spaced one from the other and supported by said inner and outer walls, a fresh air inlet into the space between said crowns and a smoke outlet from the bottom of the furnace.

In testimony whereof I have hereunto set my hand in presence of two subscribing witnesses.

ROBERT D. McMANIGAL.

Witnesses:
   EDWIN D. RICKETTS,
   BERTYE P. CORRELL.

Copies of this patent may be obtained for five cents each, by addressing the "Commissioner of Patents, Washington, D. C."